United States Patent
Herbert

(10) Patent No.: US 9,710,260 B2
(45) Date of Patent: Jul. 18, 2017

(54) INCREASING PROFICIENCY STATUS OF DEVELOPERS

(71) Applicant: American Express Travel Related Services Company, Inc., New York, NY (US)

(72) Inventor: Elizabeth Herbert, Coral Springs, FL (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 0 days.

(21) Appl. No.: 15/056,380

(22) Filed: Feb. 29, 2016

(65) Prior Publication Data

US 2016/0179506 A1  Jun. 23, 2016

Related U.S. Application Data

(63) Continuation of application No. 14/569,979, filed on Dec. 15, 2014, now Pat. No. 9,305,277, which is a continuation of application No. 13/710,706, filed on Dec. 11, 2012, now Pat. No. 8,930,882.

(51) Int. Cl.
*G06F 9/44* (2006.01)
*G06Q 10/06* (2012.01)
*G06Q 10/00* (2012.01)

(52) U.S. Cl.
CPC ............. *G06F 8/70* (2013.01); *G06F 8/10* (2013.01); *G06Q 10/00* (2013.01); *G06Q 10/063112* (2013.01)

(58) Field of Classification Search
CPC .. G06Q 10/063112; G06Q 10/00; G06F 8/70; G06F 8/10
USPC ......................................................... 717/101
See application file for complete search history.

(56) References Cited

U.S. PATENT DOCUMENTS

| | | | |
|---|---|---|---|
| 7,962,358 B1 * | 6/2011 | Fernandez | G06Q 10/06 705/7.23 |
| 8,165,857 B2 * | 4/2012 | Jain | G06Q 10/06311 703/6 |
| 8,214,240 B1 | 7/2012 | Morris et al. | |
| 8,930,882 B2 | 1/2015 | Herbert | |
| 2005/0114829 A1 | 5/2005 | Robin et al. | |
| 2007/0271108 A1 | 11/2007 | Broderick et al. | |
| 2008/0134134 A1 | 6/2008 | Avritzer et al. | |
| 2008/0301698 A1 | 12/2008 | Badaloo et al. | |
| 2009/0089138 A1 | 4/2009 | Minert et al. | |
| 2009/0254399 A1 * | 10/2009 | Cristol | G06Q 30/02 705/7.36 |
| 2009/0319344 A1 | 12/2009 | Tepper et al. | |
| 2011/0106711 A1 | 5/2011 | Goyal et al. | |
| 2011/0184771 A1 | 7/2011 | Wells | |
| 2012/0066016 A1 | 3/2012 | Minert et al. | |
| 2012/0078669 A1 | 3/2012 | Harkins et al. | |
| 2012/0136810 A1 | 5/2012 | Singh | |

(Continued)

OTHER PUBLICATIONS

USPTO; Office Action dated Mar. 24, 2014 in U.S. Appl. No. 13/710,706.

(Continued)

*Primary Examiner* — John Chavis
(74) *Attorney, Agent, or Firm* — Snell & Wilmer L.L.P.

(57) ABSTRACT

The present disclosure relates to a tool for increasing efficiency of development and upskilling of developers of software. The system may be configured to identify minimum skills for development of a software tool, identify elements of the software tool to be provided, establish a maximum timeline for completion of the elements of the software tool, based on the elements identified, and determine a proficiency status level appropriate to complete the development of the software tool based on both the identified skills and the elements.

20 Claims, 5 Drawing Sheets

(56) References Cited

U.S. PATENT DOCUMENTS

| | | |
|---|---|---|
| 2013/0073328 A1 | 3/2013 | Ehrler et al. |
| 2014/0288983 A1* | 9/2014 | Winnie ............ G06Q 10/06311 705/7.14 |
| 2015/0081363 A1* | 3/2015 | Taylor .................... G06Q 40/00 705/7.14 |
| 2016/0224908 A1* | 8/2016 | Jagannathan ........ G06Q 10/063 |

OTHER PUBLICATIONS

USPTO; Notice of Allowance dated Sep. 12, 2014 in U.S. Appl. No. 13/710,706.
Pegasystems, Exam BluePrint PRPC Certified Lead System Architect, Nov. 2012, version 6.2, http://www.pearsonvue.com/pegasystems/clsa_exam6-2_blueprint.pdf.
Pegasystems, PegaRULES Process Commander Study Guide, Aug. 2005, version 1.0, http://pegadev.com/?get_group_doc=9/1315158037-StudyGuideAnserKey.pdf.
USPTO; Non-Final Office Action dated Sep. 28, 2015 in U.S. Appl. No. 14/569,979.
USPTO; Notice of Allowance dated Feb. 18, 2016 in U.S. Appl. No. 14/569,979.
Optimized Resource Allocation for Software Release Planning, IEEE Transactions on Software Engineering, Jan./Feb. 2009, pp. 109- 123, vol. 35 No. 1, IEEE Computer Society.
Rahman, M., Ruhe, G., and Zimmerman, T., Optimized Assignment of Developers for Fixing Bugs an Initial Evaluation for Eclipse Projects, Third International Symposium on Empirical Software Engineering and Measurement, Aug. 2009, pp. 439-442, IEEE.

\* cited by examiner

| PROJECT CODE: ATTENDANCE SYSTEM ||||
|---|---|---|---|
| PROFICIENCY STATUS LEVEL | NUMBER OF USE CASES | TYPE OF USE CASES | NO. OF RESOURCES IDENTIFIED |
| EXPERT | ONE | COMPLEX | ONE |
| CORE | TWO | COMPLEX, MODERATE | TWO |
| EXPERIENCED | FIVE | MODERATE | THREE |
| MINIMUM | SEVEN | SIMPLE | FOUR |
| BEGINNER | TEN | SIMPLE | ONE |

*FIG. 2*

| DEVELOPER 1 | | | |
|---|---|---|---|
| NAME | ASSESSMENT | SKILL | PROFICIENCY STATUS LEVEL | COMPENSATION |
| JOHN SMITH | 1. Test completion time – 31 Days<br>2. Can design, code, and test Moderate PRPC use cases independently.<br>3. Experienced in software architecture.<br>4. Experienced in business processes.<br>5. Can guide business rules teams. | BUSINESS PROCESS KNOWLEDGE, SOFTWARE TOOL INTERFACE KNOWLEDGE | Level 2 EXPERIENCED | RANGE 3 |

SAVE  EDIT  OPTIONS ▷  CLOSE

| DEVELOPER 2 | | | |
|---|---|---|---|
| NAME | ASSESSMENT | SKILL | PROFICIENCY STATUS LEVEL | COMPENSATION |
| JOANNE JOHN | 1. Test completion time – 08 Days<br>2. Can design, code, and test Simple PRPC use cases with guidance.<br>3. No Experience in software interfaces<br>4. No Experience in software architecture.<br>5. No Experience in business processes. | NA | Level 0 BEGINNER | RANGE 1 |

SAVE  EDIT  OPTIONS ▷  CLOSE

DISPLAY NEXT

*FIG. 3*

INCREASING PROFICIENCY STATUS OF DEVELOPERS

CROSS-REFERENCE TO RELATED APPLICATIONS

This application is a continuation of, claims priority to and the benefit of, U.S. Ser. No. 14/569,979 filed Dec. 15, 2014 and entitled "METHOD, SYSTEM, AND COMPUTER PROGRAM PRODUCT FOR EFFICIENT RESOURCE ALLOCATION." The '979 application is a continuation of, claims priority to and the benefit of, U.S. Ser. No. 13/710,706 filed Dec. 11, 2012 and entitled "METHOD, SYSTEM, AND COMPUTER PROGRAM PRODUCT FOR EFFICIENT RESOURCE ALLOCATION," which issued on Jan. 6, 2015 as U.S. Pat. No. 8,930,882. All of which are incorporated herein in by reference in their entirety for all purposes.

FIELD OF DISCLOSURE

The present disclosure generally relates to measuring resource effectiveness. More particularly, the disclosure relates to methods, systems, and computer readable medium for efficient resource allocation.

BACKGROUND

Corporate sector companies and/or institutions such as banks, manufacturing companies, software firms, and the like (hereinafter referred to as "institutions"), use human resources for execution of a project. These institutions may want differently skilled human resources for the project. The institutions may hire human resources on contractual basis from a third party supplier and/or hire directly for the project. At instances where the institution hires the human resources from the third party supplier, the institution may provide consideration to the third party supplier in exchange for the human resources. The consideration may be based on skills, proficiency and experience of the human resources as claimed by the third party supplier. In some instances, one or more individuals of the hired human resources may not show efficiency levels, proficiency and/or skills when deployed on the project. The institution may have to train the one or more human resources to enable the one or more human resources to reach to a proficiency to work on the project. As a result, the project may get delayed. Also, the training may include investment on the one or more human resources in terms of time, resources and/or compensation. Consequently, the institution may suffer losses due to delay in project, and investment on the one or more resources.

SUMMARY OF THE DISCLOSURE

The present disclosure improves upon existing systems and methods by providing a tool for associating the proper resources to a development project. For instance, according to various exemplary embodiments, a computer based system for efficient resource allocation may be configured to identify minimum skills for development of a software tool. The computer based system may be further configured to identify elements of the software tool to be provided. The computer based system may be configured to establish a maximum timeline for completion of the elements of the software tool, based on the elements identified. The computer based system may be further configured to determine a proficiency status level appropriate to complete the development of the software tool based on the identified skills and the elements.

According to various embodiments, the proficiency status level appropriate to complete the development of the software tool, such as a minimum proficiency status level, may comprise a developer having a proficiency status level that is at least equal to the proficiency status level, such as this minimum proficiency status level. The computer based system for efficient resource allocation may be configured to perform a skills assessment of a developer of the software tool. Also, the computer based system for efficient resource allocation may be configured to perform a proficiency status level assessment of a developer of the software tool. The skills described herein may comprise at least one of technical software architecture skills, business process knowledge, and software tool interface knowledge. Software tool interface knowledge may comprise of the ability to identify and differentiate work objects, work folders, and work cover.

According to various exemplary embodiments, the proficiency status level may comprise at least one of a beginner, minimum, experienced, core, and expert. For instance, the beginner proficiency status level indicates a developer is able to design, write code and test a simple PegaRULES Process Commander (PRPC) use case with guidance, has no business process knowledge, and no software tool interface knowledge. The minimum proficiency status level indicates a developer is able to design, write code and test a simple PegaRULES Process Commander (PRPC) use case independently, has a minimum business process knowledge, and minimum software tool interface knowledge. The experienced proficiency status level indicates a developer is able to design, write code and test a moderate PegaRULES Process Commander (PRPC)/SD (Smart Disputes) use case with guidance, has experience with business processes, has experience with software tool interfaces and can guide business rules teams. The core proficiency status level indicates a developer is able to design, write code and test a moderate PegaRULES Process Commander (PRPC)/SD use case independently and utilize guidance to design, write code and test a complex PegaRULES Process Commander (PRPC)/SD use case. The core proficiency status level indicates the developer has core level experience which may include guidance with business processes, has core level experience with software tool interfaces and can guide business rules teams and process design. The expert proficiency status level indicates a developer is able to design, write code and test a complex PegaRULES Process Commander (PRPC)/SD use case independently and has expert level experience with business processes, has expert level experience with software tool interfaces and can guide business rules teams and process design.

According to various exemplary embodiments, the computer based system for efficient resource allocation may be configured to assign a developer having the appropriate proficiency status level to the development of the software tool.

The computer based system for efficient resource allocation may be configured to evaluate the projected timeline based on the proficiency status level of the developer assigned. In many cases, the compensation of a developer may be based, at least in part, on a proficiency status level of the developer. The elements of the software tool comprise a number of flows, a number of user interface screens, a number of activities, and a number of connectors.

According to various exemplary embodiments, the computer based system for efficient resource allocation may be configured to transmit developer proficiency status level designations to a third party supplier of the developers. The computer based system for efficient resource allocation may be configured to enable at least one of upskilling of a developer, knowledge increases by the developer, and greater efficiency.

BRIEF DESCRIPTION OF THE DRAWINGS

The features and advantages of the present disclosure will become more apparent from the detailed description set forth below when taken in conjunction with the drawings, in which like reference numbers indicate identical or functionally similar elements. Additionally, the left-most digit of a reference number identifies the drawing in which the reference number first appears.

FIG. 2 is an exemplary block diagram for measuring resource effectiveness, in accordance with various embodiments of the present disclosure;

FIG. 3 is an exemplary report of a developer, in accordance with various embodiments of the present disclosure;

DETAILED DESCRIPTION

Figure 1:
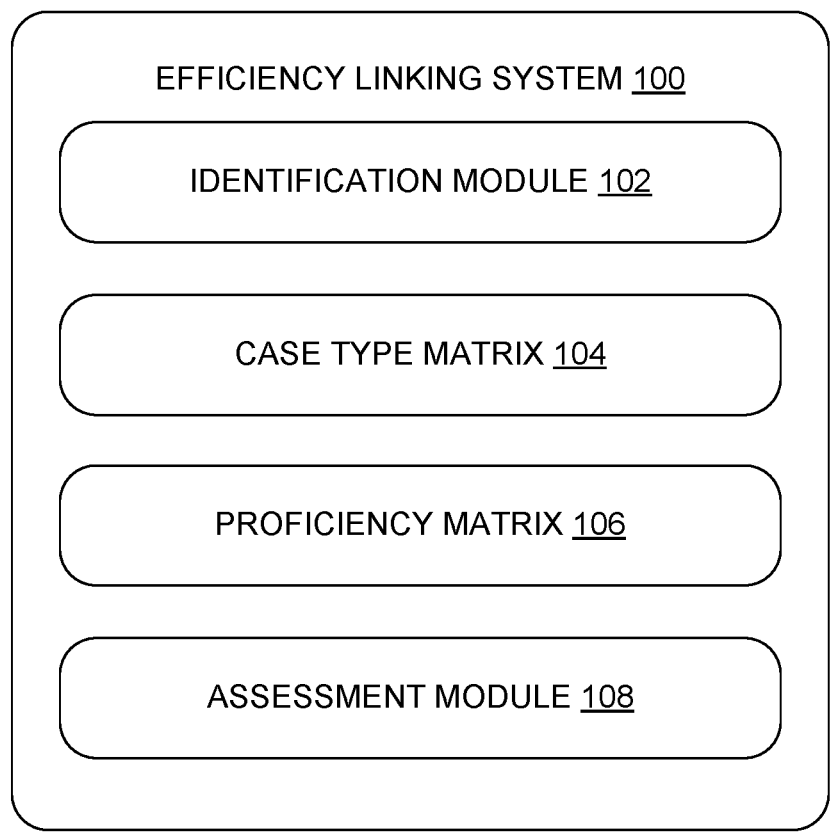
FIG. 1 is an efficient resource allocation system, in accordance with various embodiments of the present disclosure.

The present disclosure relates to method, system, and an article of manufacture for efficient resource allocation to a development project. The detailed description of exemplary embodiments of the present disclosure herein makes reference to the accompanying drawings and figures, which show the exemplary embodiments by way of illustration only. While these exemplary embodiments are described in sufficient detail to enable those skilled in the art to practice the present disclosure, it should be understood that other embodiments may be realized and that logical and mechanical changes may be made without departing from the spirit and scope of the present disclosure. It will be apparent to a person skilled in the pertinent art that this disclosure can also be employed in a variety of other applications. Thus, the detailed description herein is presented for purposes of illustration only and not of limitation. For example, the steps recited in any of the method or process descriptions may be executed in any order and are not limited to the order presented.

The present disclosure is described herein with reference to system architecture, block diagrams and flowchart illustrations of methods, and computer program products according to various aspects of the present disclosure. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flow diagram illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

The present disclosure is now described in terms of an exemplary system in which the present disclosure, in various embodiments, is implemented. This is for convenience only and is not intended to limit the application of the present disclosure. It will be apparent to one skilled in the relevant art(s) how to implement the present disclosure in alternative embodiments.

FIG. 1 shows components of an exemplary efficient resource allocation system 100, in accordance with various embodiments of the present disclosure. Efficient resource allocation system 100 associates appropriate resources to a development project. In one example, the development project may be a project for development of a software tool. The resource may be a human resource such as a developer or any Information technology (IT) professional (hereinafter referred to as "developer"). As shown in FIG. 1, efficient resource allocation system 100 may include an identification module 102, a case type matrix 104, and a proficiency matrix 106 and an assessment module 108.

Identification module 102 may identify minimum skills for development of the software tool. The skills for development of the software tools may include technical software architecture skills, business process knowledge, and/or software tool interface knowledge. Software architecture serves as the blueprint for both the system and the project. The software architecture may include details related to code language, code complexity, elements, relations between elements, properties of software etc., for the software tool to be developed. A developer having software architecture skill may have good understanding and/or experience in designing and developing use cases associated with software architectures.

Business process knowledge may be related to one or more business processes in and/or associated with the developed software. Business processes are a collection of tasks or structured activities related to each other and to a business process, for development of the software. The business processes may be based on organizational structures, nomenclatures, project requirements, key resources, key contacts, financial specifications, and the like. A developer having business process knowledge may have good understanding and/or experience in designing and developing use cases for process flows, organizational structures, financial specifications, and the like, of the software.

Software tool interface knowledge may refer to knowledge associated with software interface designing. Software interface knowledge may be related to developmental knowledge about user interface (UI) screens, input-output modules, activities, connectors, and the like, of a software. A developer having software tool interface knowledge may have a good understanding and/or experience in designing and developing use cases for interfaces. The developer having software tool interface knowledge may identify and differentiate work objects, work folders, and work cover.

Identification module 102 may store the identified minimum skills for development of a software tool. In one embodiment, identification module 102 may store the identified minimum skills information in a memory (not shown) of efficient resource allocation system 100. In various embodiments, identification module 102 may store the identified minimum skills in an external storage medium (not shown) associated with efficient resource allocation system 100. In various embodiments, identification module 102 may store the identified minimum skills in the memory and the external storage medium.

Case type matrix 104 identifies elements of the software tool. The elements of the software tool may include a number of flows, a number of user interface screens, a number of activities, and a number of connectors, design of the software tool, alternative flows in the software tool, and the like. In one embodiment, case type matrix 104 may analyze information, definition, and the like, associated with the software tool to identify the elements of the software tool. In various embodiments, case type matrix 104 may identify the elements based on input from a software architect. Other techniques for identifying elements of the software tool are contemplated herein. Case type matrix 104 determines a maximum timeline for completion of development of the software tool based on the elements identified. In one embodiment, case type matrix 104 may analyze the elements to determine complexity, skills to develop the elements, number of elements, complexity of each element, number of developers, time for developing each element, statistical data, software architect input, buffer time, and the like, to determine the maximum time. In various embodiments, case type matrix 104 may determine the maximum time based on input of the software architect.

Proficiency matrix 106 may determine a proficiency status level appropriate to complete development the software tool based on the identified skills and the elements. Proficiency matrix 106 may analyze the number of elements, the complexity involved in developing use case for each element, duration for developing use cases for each element, skills for developing use cases for each element, the statistical data, and the like, to determine the proficiency status level needed to develop the software tool. According to various exemplary embodiments, the proficiency status level may comprise at least one of a beginner, minimum, experienced, core, and expert levels. Alternatively, the proficiency status level may be defined on a coarser or on finer level in comparison with the abovementioned proficiency status levels. Each proficiency status level may indicate the capability of corresponding developer for developing use cases appropriate to the proficiency status level. The beginner proficiency status level indicates a developer is able to design, write code and test a simple PegaRULES Process Commander (PRPC) use case with guidance. The developer having the beginner proficiency status level may not have business process knowledge, and software tool interface knowledge. The PRPC may be a rules-driven Business Process Management (BPM) system that includes enterprise rules and process engine with tools for developing, deploying and evolving business process applications.

The minimum proficiency status level indicates a developer is able to design, write code and test a simple PRPC use case independently. The developer having the minimum proficiency status level may have a minimum business process knowledge, and minimum software tool interface knowledge. The experienced proficiency status level indicates a developer is able to design, write code and test a moderate PRPC/SD (Smart Disputes) use case with guidance. The developer having the experienced proficiency status level may have experience with business processes and software tool interfaces, and can guide and/or lead business rules teams. The core proficiency status level indicates a developer is able to design, write code and test a moderate PRPC/SD use case independently. The developer having core proficiency status level is also able to design, write code and test a complex PRPC/SD use case with guidance. The developer having the core proficiency status level indicates that the developer has core level experience with business processes and software tool interfaces, and can guide business rules teams and process design. The expert proficiency status level indicates a developer is able to design, write code and test a complex PRPC/SD use case independently. The developer having the expert proficiency status level indicates that the developer has expert level experience with business processes and software tool interfaces, and can guide business rules teams and process design. Although, the proficiency status level is defined for the developers able to design, write code and test different levels of PRPC/SD use cases, it can be appreciated that the proficiency status level can be defined for the developers who are able to design, write code and test use cases on different levels of other business process management systems as well. A card member or merchant inquiry that could not be resolved at the point of contact may comprise a CASE.

Proficiency matrix 106 may determine a proficiency status level appropriate to complete development of use cases for the elements based on the identified skills and the elements. For example, though any level may be determined, proficiency matrix 106 may determine that, a proficiency status level of a developer to develop a PRPC use case associated with a simple user interface element, is "beginner" or a set minimum status level and above. In another example, proficiency matrix 106 may determine that a proficiency status level of a developer to develop a PRPC use case associated with a performance critical element in the software tool is "expert".

Assessment module 108 may perform skills assessment of a developer of the software tool. Assessment module 108 may also perform a proficiency status level assessment of the developer of the software tool. Assessment module 108 may provide definition of elements of different complexity levels to the developer to design, write code and test PRPC use cases for elements of the software tool. The complexity level may be broadly classified into, for example, simple, moderate and complex. Alternatively, the complexity level may be classified into finer or on coarser levels. Assessment module 108 may determine the skills and proficiency status level of the developer. In one embodiment, assessment module 108 may determine the skills and proficiency status level of the developer a based on analysis of quality, timeliness and results of the use cases developed by the developer. In various embodiments, assessment module 108 may determine the skills and proficiency status level of the developer a based on input from an evaluator evaluating the quality, timeliness and results of the PRPC use cases developed by the developer. According to various embodiments, assessment module 108 may determine the skills and proficiency status level of the developer a based a test or set of tests.

To illustrate with an example, assessment module 108 may provide a definition of a moderate level user interface window for a developer John Doe to design, write code and test a PRPC use case for the user interface window of the software tool. Assessment module 108 may evaluate the quality of the PRPC use case for the user interface window provided by John Doe, time taken for developing the PRPC use case and result of the PRPC use case. Assessment module 108 may determine that the John Doe has core business process knowledge and has proficiency of a core developer when John Doe independently completes the use case within a defined threshold quality metric, a defined threshold of time for the experienced developer and provides a result within a defined threshold result parameter. The threshold quality metric, the defined threshold of time, and the defined threshold result parameter may be defined by, for example, a software architect of the institution. Assessment module 108 may further assess John Doe to determine whether John Doe has technical software architecture skills. Assessment module 108 may determine that John Doe has technical software architecture skills and has proficiency status level of expert, when John Doe completes the use case for the element of complex type within defined thresholds of quality, timelines and result parameter. This assessment may be revisited and/or reevaluated at any time, such as periodically, quarterly, and or semi-annually.

Assessment module 108 may assign developer proficiency status level designations to the developer based on the skill assessment and proficiency status level assessment. Assessment module 108 may assign the developer having the evaluated proficiency status level to the development of the software tool at an appropriate proficiency status level. Using the example above, John Doe may be assigned in development of complex PRPC use cases for the elements of the software tool. Similarly, assessment module 108 may assess and assign other developers having the appropriate proficiency status levels to the development of the software tool at an appropriate proficiency status levels. For example, assessment module 108 may assign a developer having minimum proficiency status level to develop PRPC use cases for simple elements of the software tool. In another example, assessment module 108 may assign a developer having core proficiency status level to develop PRPC use cases for complex elements of the software tool.

Assessment module 108 may evaluate a projected timeline based on the proficiency status level of the developers assigned to development of the software tool. Assessment module 108 may generate the projected timeline based on the number of the developers having different proficiency status levels. For instance, by aggregating and/or compiling the timelines of the different developers assigned, an aggregated and/or compiled timeline may be established. Assessment module 108 may determine compensation for the developers based on their corresponding proficiency status levels. Assessment module 108 may define different compensation bands for different proficiency skills. The compensation bands may be competitive or in par with standard compensation provided in market. Assessment module 108 may fix compensation for a developer based on the proficiency status level. Assessment module 108 may generate a report comprising skills, proficiency status level, assessment information, and compensation details. Assessment module 108 may communicate the report to, for example, a project head, human resource officers, and/or the developer. Assessment module 108 may communicate developer proficiency status level designations and the report to a third party supplier, such as a third party supplier of developers.

Assessment module 108 may use the skills and the proficiency status level information to impart training to increase knowledge and skills of the developers, while the developers continue to work on project deliverables. In various embodiments, up-skilling of the developer may occur beginning with the assigned proficiency status level of the developer. The up-skilling of the developer may include, in an example, identifying training requirements for the developer based on the proficiency status level within an assigned time period. For example, if the developer is assigned a beginner proficiency status level, the developer may be asked to participate in one or more training activities, such that the developer's proficiency status level may be improved. The training activities may include knowledge share sessions, framework reviews, architecture reviews, business process and project requirements review, GDM architecture review, and the like. The developer may also be assigned active tasks assignments such as documenting software use cases, data table design, design of agents and batch processing, designing process flows, development of user interfaces, building connectors, and the like. The developer's performance in the training activities may be monitored to assess quality and overall improvement of the developer. Further, if the developer completes tasks independently or with minimal guidance, the developer may be given more challenging activities and use cases. Also, new training activities may be formulated to meet the development model.

In various embodiments, the proficiency status level assigned to each developer may be transmitted to a third party supplier the developers. The third party supplier may be, in an example, a company or a firm having a contract with the institution implementing efficient resource allocation system 100. The third party supplier may provide a resource pool to the institution for various projects. Based on the proficiency status level assigned to each developer, the third party supplier may determine, in coordination with the institution, factors such as number of developers to be provided, time period of contract, overall compensation, and the like. Further, the third party supplier may recruit new developers having skills, identified and appropriate for development of the software tool. Such a step may insure that good quality resources are provided to the institution by the third party supplier.

In an exemplary implementation, the developer may be assessed periodically for determination of the proficiency status of the developer. The period may be, for example, every six months, such that knowledge and skill sets of the developer are updated. Further, the institution and the third party may have discussions over the assessment of the developer to clear expectations and drive expectations of the institution. Furthermore, training plans and schedules may be updated where necessary.

Although, the disclosure discusses about efficient resource allocation system 100 determining proficiency status level of a developer, for development of a software tool, efficient resource allocation system 100 may also be used for other any other projects such as projects related to finance, research, security, and the like. Further, efficient resource allocation system 100 as described herein may be managed by an institution (not shown) and/or a third-party supplier of the vendor (not shown) associated with the institution.

In various embodiments, efficient resource allocation system 100 may be implemented as a set of computer related instructions. In various embodiments, efficient resource allocation system 100 may be configured to execute a set of computer related instructions. The computer readable instructions of corresponding modules and tools may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

The system may be described herein in terms of functional block components, optional selections and various processing steps. It should be appreciated that such functional blocks may be realized by any number of hardware and/or software components configured to perform the specified functions. For example, efficient resource allocation system 100 may employ various integrated circuit components, e.g., memory elements, processing elements, logic elements, look-up tables, and/or the like, which may carry out a variety of functions under the control of one or more microprocessors or other control devices. Similarly, the software elements of efficient resource allocation system 100 may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Further, it should be noted that system 100 may employ any number of conventional techniques for data transmission, signaling, data processing, network control, and/or the like. Still further, system 100 could be used to detect or prevent security issues with a client-side scripting language, such as JavaScript, VBScript or the like.

FIG. 2 illustrates an exemplary project for which assessment of resources is performed by the efficient resource allocation system. In an example, the project may relate to development of an attendance marking tool for an institution. As depicted, a project code "Attendance System" may be designated to the project and various parameters related to assessment of the resources may be accumulated. The various parameters may include proficiency status levels, number of use cases assigned, types of use case assigned, and number of resources identified to have the different proficiency status levels. As described in the foregoing, the different proficiency levels may include expert, core, experienced, minimum, and beginner. FIG. 2 displays various fields in connection with the project. The fields include proficiency status level field, number of use cases field, type of use cases field, and number of resources identified field. The proficiency status level field indicates the proficiency status level for a number of PRPC use cases (illustrated in number of use case field). The type of use cases indicate complexity involved in the PRPC use cases. The number of resources identified for the use cases may indicate the resources assessed and assigned and/or available for completing the attendance system project. Although the figure illustrates the proficiency status level field, the number of use cases field, the type of use cases field, and the number of resources identified field, one can appreciate that other fields may be included.

In an example depicted in FIG. 2, for assessing the resources for expert proficiency status level, the resources may be provided with definitions of elements to developers to design, write and test the PRPC use case to. The attendance system may be a moderate level software for an enterprise. The definitions for elements may include instructions to complete a PRPC use case elements of the attendance system in a stipulated time period. The overall performance and time taken by each resource to complete the use case may be assessed and accumulated. The proficiency status levels may be assigned to the developers based on the assessment of the resources. As shown in FIG. 2, only one resource is found to have successfully designed, written and tested the PRPC use case independently for architectural elements of the attendance system, within the stipulated time period. Thus, the number of resources to be assigned with an expert proficiency status level is one, as depicted.

As illustrated in FIG. 2, two developers have successfully designed, written and tested moderate level PRPC use cases, independently. The two developers may not have successfully designed, written and tested complex level PRPC use cases, independently. The two developers may be assessed to be having core proficiency status level. For determining the experienced proficiency status level, the resources may be given five different moderate use cases to work upon. These may be assigned to be completed sequentially or concurrently and/or a combination thereof. The experienced proficiency status level may be assigned to the resources that complete the moderate use cases, under supervision, within stipulated time periods adhering to the provided instructions. As depicted in FIG. 2, three resources are found to have an experienced proficiency status level. Similarly, for three developers have assessed to be at experienced proficiency status level, four developers have been assessed to be at minimum proficiency status level and one developer has been assessed to be at beginner proficiency status level.

FIG. 3 is a user interface view illustrating report including skills and proficiency status levels of developers. The skills and proficiency status level of the developers may be assessed as described above. FIG. 3 illustrates a report of the developers John Smith and Joanne John.

As depicted by an example in FIG. 3, proficiency status levels are assigned to two different developers, i.e. developer 1 and developer 2. The report may include different fields providing information associated with the developer. In the current example, the fields in the report include name of the developers, assessment, skill, assigned proficiency status levels, and compensation range. In other examples, fields other than those described in the figure may also be displayed. The other fields may include designation of the developers, details about third party provider of these developers, details regarding previously completed projects, and the like. These parameters may be optionally displayed in a drop-down list, for example, by clicking an "Options" tab.

As shown in FIG. 3, for developer 1 (name "John Smith") the expertise level report is based on results of an assignment which the developer 1 has undergone. The assignment, in an example, may be formulated for assessing one or more developers, based on the identified skills for development of a software tool, identified elements of the software tool, and maximum timeline for completion of the identified elements. The assignment may include definitions of elements for the developers to design, write code and test PRPC use cases. The assignment may be evaluated (at any time) and results of overall performance of each of the developers may be recorded and summarized in the assessment field.

Referring back to FIG. 3, for developer 1, the assessment field displays time taken to complete the test, complexity of PRPC use cases completed and results associated with the assessment of developer 1. The test may reflect a simulated need and/or an actual need of the institution (e.g. live vs. practice). As depicted, for developer 1 the completion time of the test is 31 days. Further, the assessment field summarizes that the developer 1 can design, code, and test moderate PRPC use cases independently. The assessment field further summarizes that the developer 1 is experienced in software architecture and business processes and can guide business rules teams. Based on the assessment, the developer 1 is recognized to have business process knowledge, and software tool interface knowledge skill. The skill field associated with the developer 1 illustrates the developer 1's skill. Further, based on assessment, an experienced proficiency status level is assigned to developer 1. The efficiency level associated with the experienced status level is given as "level 2". Compensation, to be given to developer 1 may be based on the proficiency status level assigned to developer 1, i.e. experienced. Hence, compensation to be given to developer 1 falls under range 3, as depicted in compensation field of FIG. 3. Range 3 may be a standard compensation scale provided to developers having experienced proficiency status level.

Similarly, for developer 2 (name "Joanne John") the assessment field displays time taken for completion of the test as 08 days. The assessment field further displays that developer 2 can design, code and test simple PRPC use cases with guidance. Further, as depicted, the assessment field summarizes that developer 2 does not have any experience in software interfaces, software architecture and business processes. The skill field illustrates 'NA' indicating that the developer 2 is just a beginner. Based on the assessment field and skill field, a beginner proficiency status level is assigned to developer 2 (illustrated in proficiency status level field). The efficiency level associated with the beginner proficiency status level is given as "level 0". The compensation to be given to developer 2 may also be based on the proficiency status level assigned (here "beginner"). Hence, as depicted, the compensation to be given to developer 2 falls under range 1.

In an example, a user using efficient resource allocation system 100 such as a software architect, a project leader, a manager, and the like, may wish to see more details about the developers than that depicted in the expertise level report. In an example, more details may be displayed in the expertise level report by clicking on the "options" tab. For example, the expertise level report for a developer may display additional details such as current project assigned to the developer, current project status, last evaluation date of the developer, date of recruitment of the developer, recent tasks and/or training completed by the developer and the like. The additional information about the developer may help the user to make an accurate assessment of the developer.

In an exemplary implementation, the user may have an option of editing the one or more fields for the developer displayed in FIG. 3. For example, if a certain developer is not experienced in software architecture but the user feels that the developer can still be assigned a proficiency status level of experienced, the user may do so. In such an example, if the developer's compensation as evaluated by efficient resource allocation system 100 falls under range 2, the user may change the compensation range for the developer to range 3. The user may change the one or more fields by clicking "options" tab.

As depicted, the user may save the expertise level report and the compensation details of the developer using "save" tab. The "display next" tab may be clicked for displaying assessment details for next two developers. Further, "close" tab may be used for closing the current file, after the file has been saved by the user.

Figure 4:
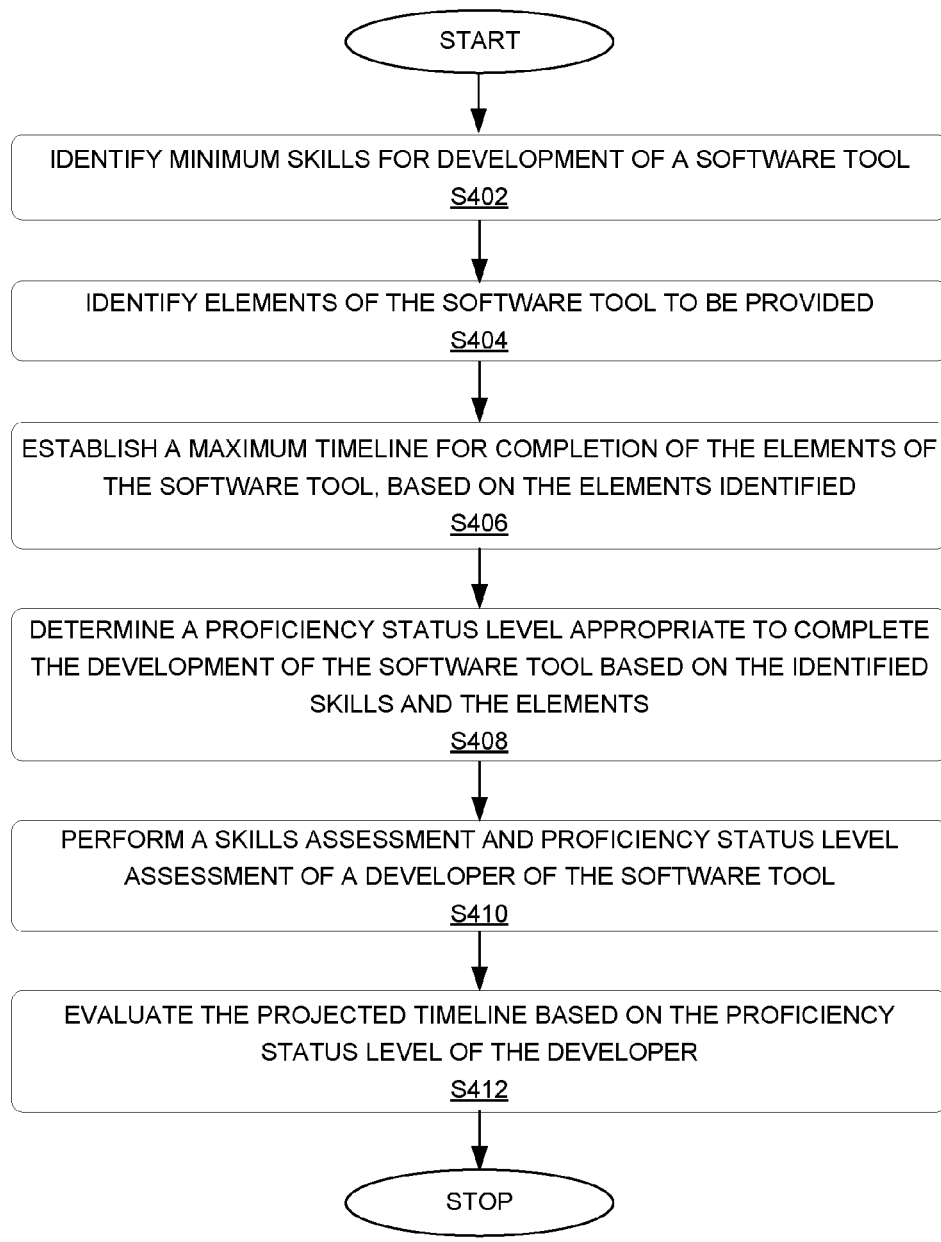
FIG. 4 is a process flow for efficient resource allocation of a developer with a project tool, in accordance with various embodiments of the present disclosure.

FIG. 4 illustrates a flowchart of an example process 400 for measuring resource effectiveness, according to various embodiments of the present disclosure.

Process 400 may start at step S402, where identification module 102 identifies minimum skills for development of the software tool. In various embodiments, the skills may include technical software architecture skills, business process knowledge, and software tool interface knowledge. The technical software tool interface knowledge includes an ability to identify and differentiate work objects, work folders, and work folders. In an example, the identified skills are stored in the memory of efficient resource allocation system 100.

At step S404, case type matrix 104 may identify elements of the software tool. In various embodiments, the elements of the software tool may include flows, UI screens, activities, and connectors. In an example, the elements of the software tool may be identified by case type matrix 104 of efficient resource allocation system 100. At step S406, case type matrix 104 may identify a maximum timeline for completion of the elements of the software tool based on the identified elements. At step S408, proficiency matrix 106 determines a proficiency status level appropriate to complete the development of the software tool based on the identified skills and the elements. The proficiency status level may be one of beginner, minimum, experienced, core and expert.

At step S408, assessment module 108 may perform a skills assessment and a proficiency status level assessment of the developer of the software tool. In step S410, assessment module 108 may evaluate the projected timeline based on the proficiency status level of the developer. The proficiency status level may also be utilized for determining compensation of the developer as well as up-skilling of the developer. In various embodiments, the proficiency status level designations of the developer are transmitted to a third party supplier of a developer.

The present disclosure (i.e., system 100, process 400, or any part(s) or function(s) thereof) may be implemented using hardware, software or a combination thereof, and may be implemented in one or more computer systems or other processing systems. However, the manipulations performed by the present disclosure were often referred to in terms, such as comparing or checking, which are commonly associated with mental operations performed by a human operator. No such capability of a human operator is necessary, or desirable in most cases, in any of the operations described herein, which form a part of the present disclosure. Rather, the operations are machine operations. Useful machines for performing the operations in the present disclosure may include general-purpose digital computers or similar devices.

Figure 5:
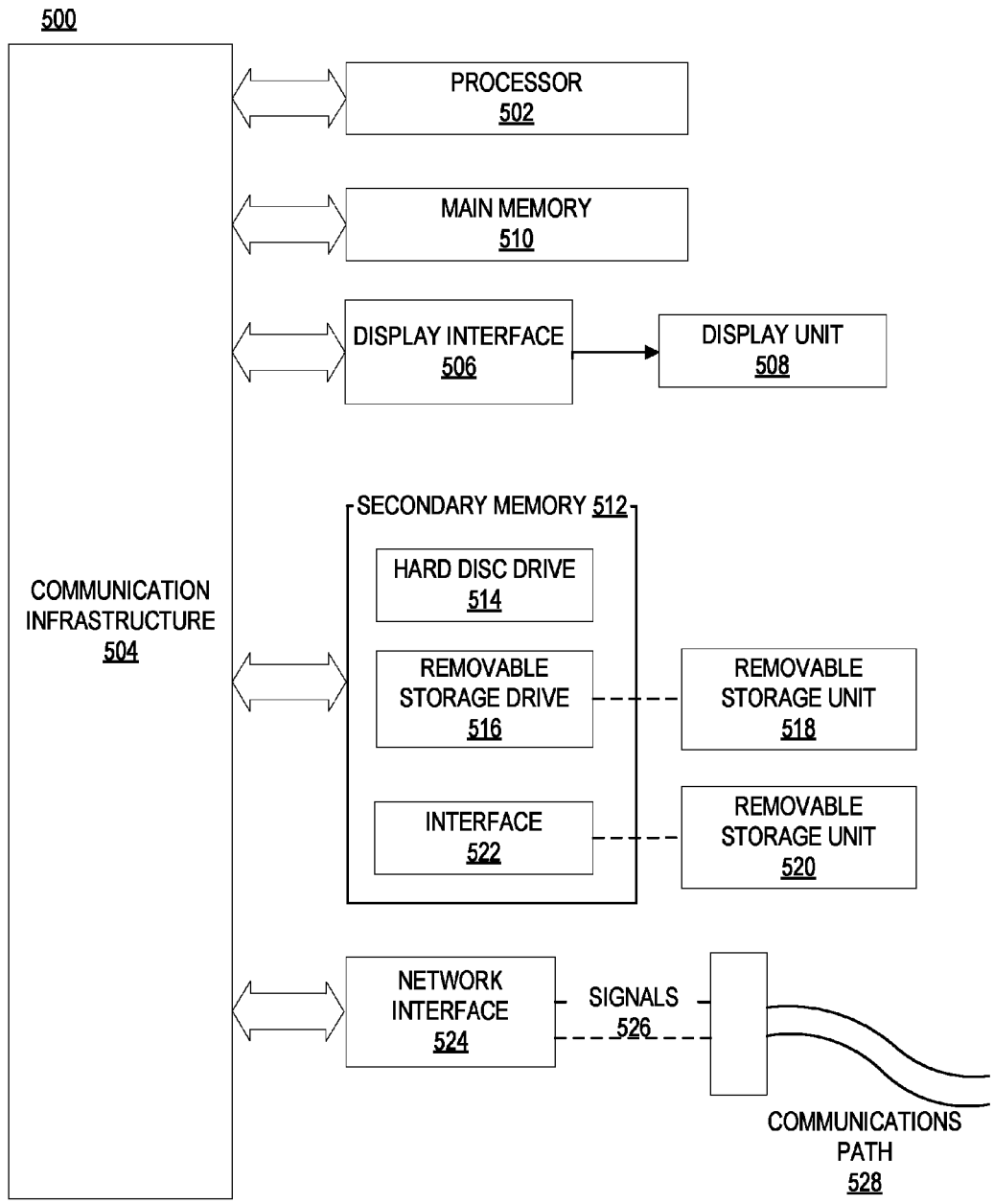
FIG. 5 is a block diagram of an exemplary computer system for implementing the present disclosure, in accordance with various embodiments of the present disclosure.

In fact, in accordance with various embodiments of the present disclosure, the present disclosure is directed towards one or more computer systems capable of carrying out the functionality described herein. An example of the computer systems includes a computer system 500, which is shown in FIG. 5.

The computer system 500 includes at least one processor, such as a processor 502. Processor 502 is connected to a communication infrastructure 504, for example, a communications bus, a cross over bar, a network, and the like. Various software embodiments are described in terms of this exemplary computer system 500. After reading this description, it will become apparent to a person skilled in the relevant art(s) how to implement the present disclosure using other computer systems and/or architectures.

The computer system 500 includes a display interface 506 that forwards graphics, text, and other data from the communication infrastructure 504 (or from a frame buffer which is not shown in FIG. 5) for display on a display unit 508.

The computer system 500 further includes a main memory 510, such as random access memory (RAM), and may also include a secondary memory 512. The secondary memory 512 may further include, for example, a hard disk drive 514 and/or a removable storage drive 516, representing a floppy disk drive, a magnetic tape drive, an optical disk drive, etc. The removable storage drive 516 reads from and/or writes to a removable storage unit 518 in a well-known manner. The removable storage unit 518 may represent a floppy disk, magnetic tape or an optical disk, and may be read by and written on by the removable storage drive 516. As will be appreciated, the removable storage unit 518 includes a computer usable storage medium having stored therein, computer software and/or data. The computer system 500 further includes non-transitory, tangible computer readable storage medium comprising the instructions disclosed and/or contemplated herein.

In accordance with various embodiments of the present disclosure, the secondary memory 512 may include other similar devices for allowing computer programs or other instructions to be loaded into the computer system 500. Such devices may include, for example, a removable storage unit 520, and an interface 522. Examples of such devices may include a program cartridge and cartridge interface (such as that found in video game devices), a removable memory chip (such as an erasable programmable read only memory (EPROM), or programmable read only memory (PROM)) and associated socket, and other removable storage units 520 and interfaces 522, which allow software and data to be transferred from the removable storage unit 520 to the computer system 500.

The computer system 500 may further include a communication interface 524. The communication interface 524 allows software and data to be transferred between the computer system 500 and external devices. Examples of the communication interface 524 include, but may not be limited to a modem, a network interface (such as an Ethernet card), a communications port, a Personal Computer Memory Card International Association (PCMCIA) slot and card, and the like. Software and data transferred via the communication interface 524 are in the form of a plurality of signals, hereinafter referred to as signals 526, which may be electronic, electromagnetic, optical or other signals capable of being received by the communication interface 524. The signals 526 are provided to the communication interface 524 via a communication path (e.g., channel) 528. The communication path 528 carries the signals 526 and may be implemented using wire or cable, fiber optics, a telephone line, a cellular link, a radio frequency (RF) link and other communication channels.

In this document, the terms "computer program medium" and "computer usable medium" are used to generally refer to media such as the removable storage drive 516, a hard disk installed in hard disk drive 514, the signals 526, and the like. These computer program products provide software to the computer system 500. The present disclosure is directed to such computer program products.

Computer programs (also referred to as computer control logic) are stored in the main memory 510 and/or the secondary memory 512. Computer programs may also be received via the communication interface 504. Such computer programs, when executed, enable the computer system 500 to perform the features of the present disclosure, as discussed herein. In particular, the computer programs, when executed, enable the processor 502 to perform the features of the present disclosure. Accordingly, such computer programs represent controllers of the computer system 500.

In accordance with various embodiments of the present disclosure, where the present disclosure is implemented using a software, the software may be stored in a computer program product and loaded into the computer system 500 using the removable storage drive 516, the hard disk drive 514 or the communication interface 524. The control logic (software), when executed by the processor 502, causes the processor 502 to perform the functions of the present disclosure as described herein.

In various embodiments, the present disclosure is implemented primarily in hardware using, for example, hardware components such as application specific integrated circuits (ASIC). Implementation of the hardware state machine so as to perform the functions described herein will be apparent to persons skilled in the relevant art(s).

As those skilled in the art will appreciate, a web client includes an operating system (e.g., Windows NT, 95/98/2000/CE/Mobile, OS2, UNIX, Linux, Solaris, MacOS, PalmOS, etc.) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In an exemplary embodiment, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

In various embodiments, components, modules, and/or engines of system 100 may be implemented as micro-applications or micro-apps. Micro-apps are typically deployed in the context of a mobile operating system, including for example, a Palm mobile operating system, a Windows mobile operating system, an Android Operating System, Apple iOS, a Blackberry operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, Dish networks, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/publications/nistpubs/800-145/SP800-145.pdf (last visited June 2012), which is hereby incorporated by reference in its entirety.

In various embodiments the present disclosure is implemented using a combination of both the hardware and the software. The various embodiments of the present disclosure have been described above, it should be understood that they have been presented by way of example, and not limitation. It will be apparent to persons skilled in the relevant art(s) that various changes in form and detail can be made therein without departing from the spirit and scope of the present disclosure. Thus, the present disclosure should not be limited by any of the above described exemplary embodiments, but should be defined only in accordance with the following claims and their equivalents.

In addition, it should be understood that the figures illustrated in the attachments, which highlight the functionality and advantages of the present disclosure, are presented for example purposes only. The architecture of the present disclosure is sufficiently flexible and configurable, such that it may be utilized (and navigated) in ways other than that shown in the accompanying figures.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in *In Re Nuijten* to fall outside the scope of patentable subject matter under 35 U.S.C. §101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present disclosure in any way.

What is claimed is:

1. A method comprising:
   determining, by a computer-based system and using a proficiency matrix and using an assessment module, proficiency status levels appropriate to complete the development of a software tool,
   wherein the proficiency status levels are based on an analysis of a maximum timeline for completion of the elements of the software tool using a case type matrix, minimum skills for development of a software tool using an identification module and elements of the software tool using the case type matrix;
   assigning, by the computer-based system, use cases to developers; and
   increasing, by the computer-based system, the proficiency status level of the developers, in response to completion of the use cases.

2. The method of claim 1, wherein the proficiency status level appropriate to complete the development of the software tool comprises a developer proficiency status level that is at least equal to the proficiency status level.

3. The method of claim 1, further comprising performing, by the computer-based system, a skills assessment of a developer of the software tool.

4. The method of claim 1, further comprising performing, by the computer-based system, a proficiency status level assessment of a developer of the software tool.

5. The method of claim 1, wherein the minimum skills comprise at least one of technical software architecture skills, business process knowledge, or software tool interface knowledge.

6. The method of claim 1, wherein the minimum skills comprise software tool interface knowledge, and wherein the software tool interface knowledge comprises an ability to identify and differentiate work objects, work folders, and work cover.

7. The method of claim 1, further comprising transmitting, by the computer-based system, the proficiency status levels to a third party supplier of developers, wherein the third party supplier determines a number of developers to be provided based on the received proficiency status levels, and a time period of the contract based on the maximum timeline for completion.

8. The method of claim 1, wherein the proficiency status level is beginner which indicates a developer is able to design, write code and test a simple PegaRULES Process Commander (PRPC) use case with guidance, has no business process knowledge, and no software tool interface knowledge.

9. The method of claim 1, wherein the proficiency status level is minimum which indicates a developer is able to design, write code and test a simple PegaRULES Process Commander (PRPC) use case independently, has a minimum business process knowledge, and minimum software tool interface knowledge.

10. The method of claim 1, wherein the proficiency status level is experienced which indicates a developer is able to design, write code and test a moderate PegaRULES Process Commander (PRPC) use case with guidance, has experience with business processes, has experience with software tool interfaces and can guide business rules teams.

11. The method of claim 1, wherein the proficiency status level is core which indicates a developer is able to design, write code and test a moderate PegaRULES Process Commander (PRPC) use case with guidance, and design, write code and test a core PegaRULES Process Commander (PRPC) use case with guidance, has core level experience with business processes, has core level experience with software tool interfaces and can guide business rules teams and process design.

12. The method of claim 1, wherein the proficiency status level is expert which indicates a developer is able to design, write code and test a complex PegaRULES Process Commander (PRPC) use case independently, has expert level experience with business processes, has expert level experience with software tool interfaces and can guide business rules teams and process design.

13. The method of claim 1, further comprising determining, by the computer based system, a number of developers to be provided based on the received proficiency status levels, and a time period of the contract based on the maximum timeline for completion.

14. The method of claim 1, further comprising evaluating, by the computer-based system, a projected timeline based on the proficiency status level of the developer assigned.

15. The method of claim 1, wherein the compensation of a developer is based on the proficiency status level of the developer.

16. The method of claim 1, wherein the elements of the software tool comprise at least one of a number of flows, a number of user interface screens, a number of activities, or a number of connectors.

17. The method of claim 1, further comprising establishing, by the computer-based system, the maximum timeline for completion of the elements of the software tool, based on the elements identified.

18. The method of claim 1, further comprising enabling, by the computer-based system, upskilling by a developer.

19. A system comprising:
a processor,
a tangible, non-transitory memory configured to communicate with the processor,
the tangible, non-transitory memory having instructions stored thereon that, in response to execution by the processor, cause the processor to perform operations comprising:
determining, by the processor and using a proficiency matrix and using an assessment module, proficiency status levels appropriate to complete the development of a software tool,
wherein the proficiency status levels are based on an analysis of a maximum timeline for completion of the elements of the software tool using a case type matrix, minimum skills for development of a software tool using an identification module and elements of the software tool using the case type matrix;
assigning, by the processor, use cases to developers; and
increasing, by the processor, the proficiency status level of the developers, in response to completion of the use cases.

20. An article of manufacture including a non-transitory, tangible computer readable storage medium having instructions stored thereon that, in response to execution by a computer-based system, cause the computer-based system to perform operations comprising:
determining, by the computer-based system and using a proficiency matrix and using an assessment module, proficiency status levels appropriate to complete the development of a software tool,
wherein the proficiency status levels are based on an analysis of a maximum timeline for completion of the elements of the software tool using a case type matrix, minimum skills for development of a software tool using an identification module and elements of the software tool using the case type matrix;
assigning, by the computer-based system, use cases to developers; and
increasing, by the computer-based system, the proficiency status level of the developers, in response to completion of the use cases.

* * * * *